(12) United States Patent
Taira et al.

(10) Patent No.: US 6,431,762 B1
(45) Date of Patent: Aug. 13, 2002

(54) OPTICAL CONNECTOR ADAPTER

(75) Inventors: Junji Taira; Masahiro Nakajima; Yuko Hata, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/546,197

(22) Filed: Apr. 10, 2000

(30) Foreign Application Priority Data

Apr. 9, 1999 (JP) .......................................... 11-102501
May 14, 1999 (JP) .......................................... 11-134953

(51) Int. Cl.[7] ................................................. G02B 6/38
(52) U.S. Cl. .......................... 385/56; 385/53; 385/55; 385/60; 385/65; 385/66; 385/70; 385/72; 385/77; 385/78
(58) Field of Search ...................... 385/53, 56, 55, 385/60, 65, 70, 72, 77, 78, 139, 64, 66

(56) References Cited

U.S. PATENT DOCUMENTS

| | | | | |
|---|---|---|---|---|
| 4,964,689 A | * | 10/1990 | Wichansky ................... | 385/56 |
| 5,073,042 A | * | 12/1991 | Mulholland et al. .......... | 385/69 |
| 5,142,597 A | * | 8/1992 | Mulholland et al. .......... | 385/56 |
| 5,359,688 A | * | 10/1994 | Underwood ................... | 385/70 |
| 5,418,875 A | * | 5/1995 | Nakano et al. ................ | 385/77 |
| 5,537,501 A | * | 7/1996 | Iwano et al. ................... | 385/58 |
| 5,542,015 A | * | 7/1996 | Hultermans ................... | 385/60 |
| 5,680,494 A | * | 10/1997 | Kaas ............................. | 385/56 |
| 5,774,612 A | | 6/1998 | Belenkly et al. .............. | 385/72 |
| 5,838,855 A | * | 11/1998 | Stephenson ................... | 385/53 |

FOREIGN PATENT DOCUMENTS

JP          9105836      4/1997      ............... 385/56 X

* cited by examiner

Primary Examiner—Brian Healy
(74) Attorney, Agent, or Firm—Adams & Wilks

(57) ABSTRACT

An optical connector adapter has an optical connection sleeve having a first end portion and a second end portion opposite the first end portion. A sleeve holder has a first cylindrical member having a first through-hole receiving the first end portion of the optical connection sleeve. The sleeve holder is disposed in a tubular housing which has a second cylindrical member having a second through-hole receiving the second end portion of the optical connection sleeve. Engagement members engage the sleeve holder and the housing together in a state that a first end of the first cylindrical member and a first end of the second cylindrical member are abutted against each other. Engagement convex portions project radially inward at respective second ends of the first cylindrical member and the second cylindrical member for regulating movement of the optical connection sleeve in an axial direction.

32 Claims, 19 Drawing Sheets prior art prior art

OPTICAL CONNECTOR ADAPTER

BACKGROUND OF THE INVENTION

1. Field of the Invention

The present invention relates to a structure for supporting an sleeve to optically connect an optical connector adapter that is reduced in the number of parts, and to an optical connector adapter using same.

2. Description of the Prior Arts

The conventional optical connector adapter represented by an SC type optical connector adapter incorporates an optical connection sleeve to provide alignment between opposite ferrules having therein an optical fiber and to optically couple between the optical fibers. The optical connection sleeve is held by a sleeve holder that is axially divided into two. The sleeve holder is in turn held by a housing axially divided into two.

Herein, FIG. 11 and FIG. 12 show an outside appearance and longitudinal view of an SC type connector adapter. As shown in the figures, an optical connection sleeve 101, such as a split sleeve having a slit, is incorporated in a pair of sleeve holders 102 and 103. Also, the pair of sleeve holders 102 and 103 are held by a pair of housings 104 and 105.

The sleeve holders 102 and 103 have respective support holes 102a and 103a to incorporate therein the optical connection sleeve 101. The support holes 102a and 103a each have, at one end, a stop 102b, 103b provided in a circumferential direction and having a circumferential edge inwardly projecting. The stops 102b and 103b are to abut against an end face of the optical connection sleeve 101 to regulate the optical connection sleeve 101 from moving in an axial direction. Also, the pair of sleeve holders 102 and 103 are of a structure to clamp axially oppositely the optical connection sleeve 101. Consequently, the axially inner ends are of a fitting structure, at circumferential edges of which are provided flanges 102c and 103c. The sleeve holders 102 and 103 each have, in radially opposite positions, a pair of claw portions 102e and 103e having respective engagement claws 102d and 103d at their tips.

On the other hand, the housings 104 and 105 respectively have flanges 104a and 105a to connect the both and support grooves 104b and 105b formed in inner surfaces that clamp and support the flanges 102c and 103c of the sleeve holders 102 and 103. By welding the flanges 104a and 105a of the housings 104 and 105 through ultrasonic waves, etc., the sleeve holders 102 and 103 are clamped and held in the support grooves 104b and 105b formed in the inner peripheral surface of the housings 104 and 105. Also, the housings 104 and 105 each have, on an opposite side to the flange 104a, 105a, an opening 104c, 105c in which an optical connector plug can be inserted.

Incidentally, one housing 105 is provided, at an outer peripheral surface, with a plate 106 as a metal-make engagement spring to engage with an optical connector mount panel.

As described above, the conventional optical connector adapter requires to implement ultrasonic welding, screwing and riveting after combining the five parts. This results in a problem with increased assembling operation and hence mount-up of cost. Also, many parts leads to increase of material cost.

Meanwhile, there also is a problem of difficulty in enhancing the accuracy of positioning the left and right housings. There is possibly a case of causing change in optical connection stability, particularly in reproducibility of optical loss upon repeating connector connection and disconnection or in optical loss when applying tension or bending to an optical fiber cord.

SUMMARY OF THE INVENTION

It is an object of the present invention to provide, in view of the above circumstances, a support structure of an optical connection sleeve for an optical connector adapter, and an optical connector adapter, which are reduced in the number of parts and improved in the accuracy of positioning left and right housing.

A first form of the present invention to solve the problem lies in an optical connector adapter having a penetration hole for incorporate and support an optical connection sleeve, comprising: a sleeve holder integrally provided with a first cylindrical member forming lengthwise one end of the penetration hole; a housing integrally provided with a second cylindrical member forming the lengthwise other end of the penetration hole and having a shape to internally hold the sleeve holder; engagement means for engaging the sleeve holder and the housing in a state that the first cylindrical member and the second cylindrical member at respective one ends are abutted against each other; and engagement convex portions integrally formed projecting radially inward at respective other ends of the first cylindrical member and the second cylindrical member to regulate the optical connection sleeve from moving in an axial direction.

A second form of the invention lies in an optical connector adapter, wherein in the first form the engagement means has an engagement pin inserted and held in the housing in a state that the sleeve holder is assembled with the housing, and an engagement portion integrally provided on the sleeve holder to engage the engagement pin in a state combined with the housing.

A third form of the invention lies in an optical connector adapter, wherein in the first form the engagement means has an engagement claw provided on any one of the housing and the sleeve holder to be elastically deformable in an radial direction, and an engagement recess provided on the other to engage the claw.

A fourth form of the invention lies in an optical connector adapter, wherein in any of the first to third forms the housing is formed with an aperture to be coupled with an optical connector plug.

In the optical adapters of the invention, the optical connector adapter can be assembled by merely assembling the housing with the sleeve holder through the engagement means in a state an optical connection sleeve is internally assembled.

A fifth form of the invention lies in an optical connector adapter, each pair of claw portions are provided appositely of shorter sides of the flange such that they sandwich the first cylindrical member and the housing second cylindrical member, and have a pair of claw portions and having engagement claws at tips. These claw portions are to couple with an optical connector plug. Further the claw portion having a thickness continuously decreasing toward the engagement claw.

The claw portion of the above form can reduce the strength of deforming the claw portion when coupling a connector plug. As a result, an optical connector adapter is available that is easy to couple.

A sixth form of the invention lies in an optical connector adapter, wherein in the fifth form the claw portion is in a concave form on an outer periphery side of the cylindrical member. By forming in a concave-form curved surface, it is possible to prevent fatigue and breakage in the claw portion due to repetition of connector plug connection and disconnection.

DETAILED DESCRIPTION OF THE PREFERRED EMBODIMENTS

Embodiments of the present invention will now be described with reference to the drawings.

(Embodiment 1)

Figure 1:
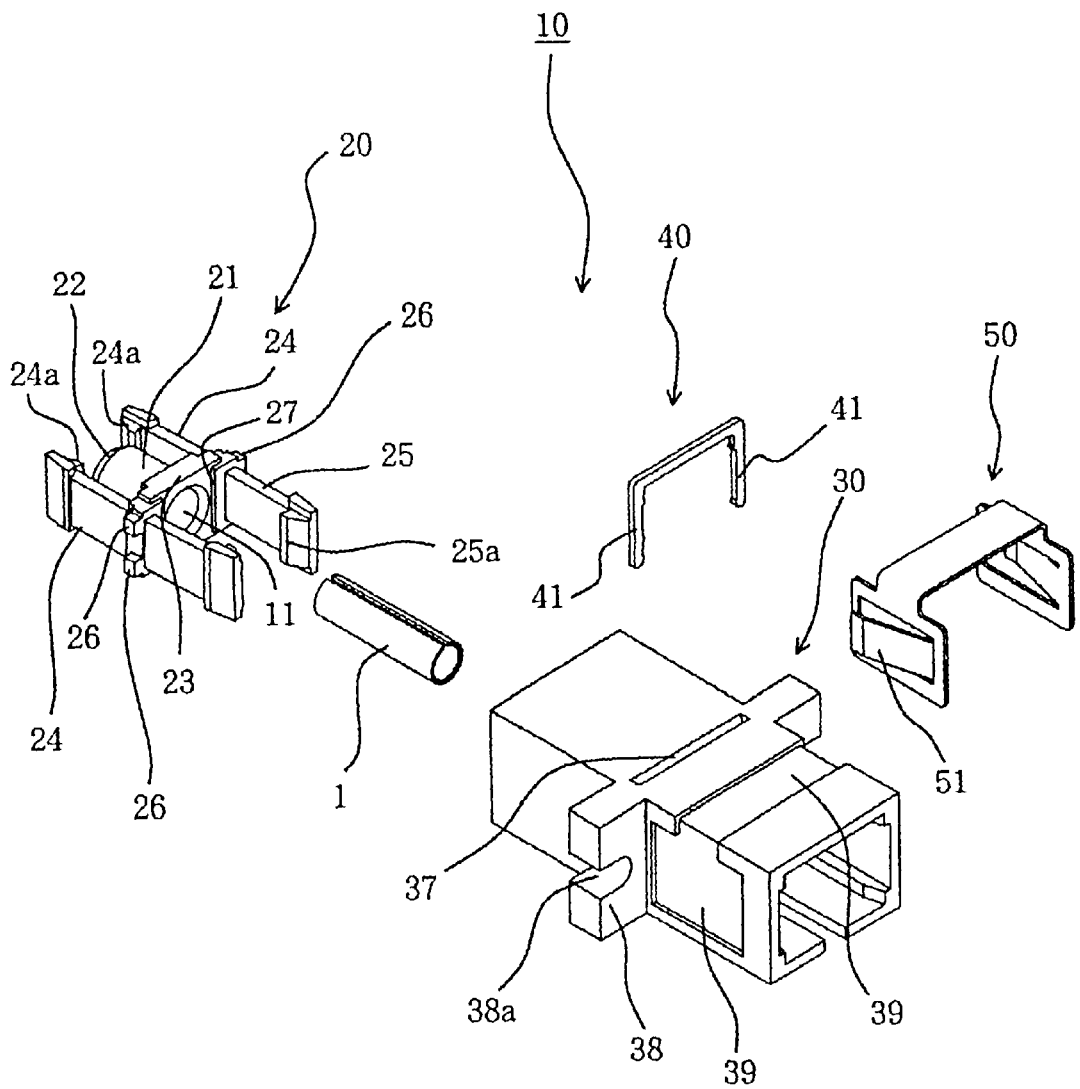
FIG. 1 is an exploded perspective view of an optical connector adapter according to Embodiment 1 of the present invention.
Figure 2:
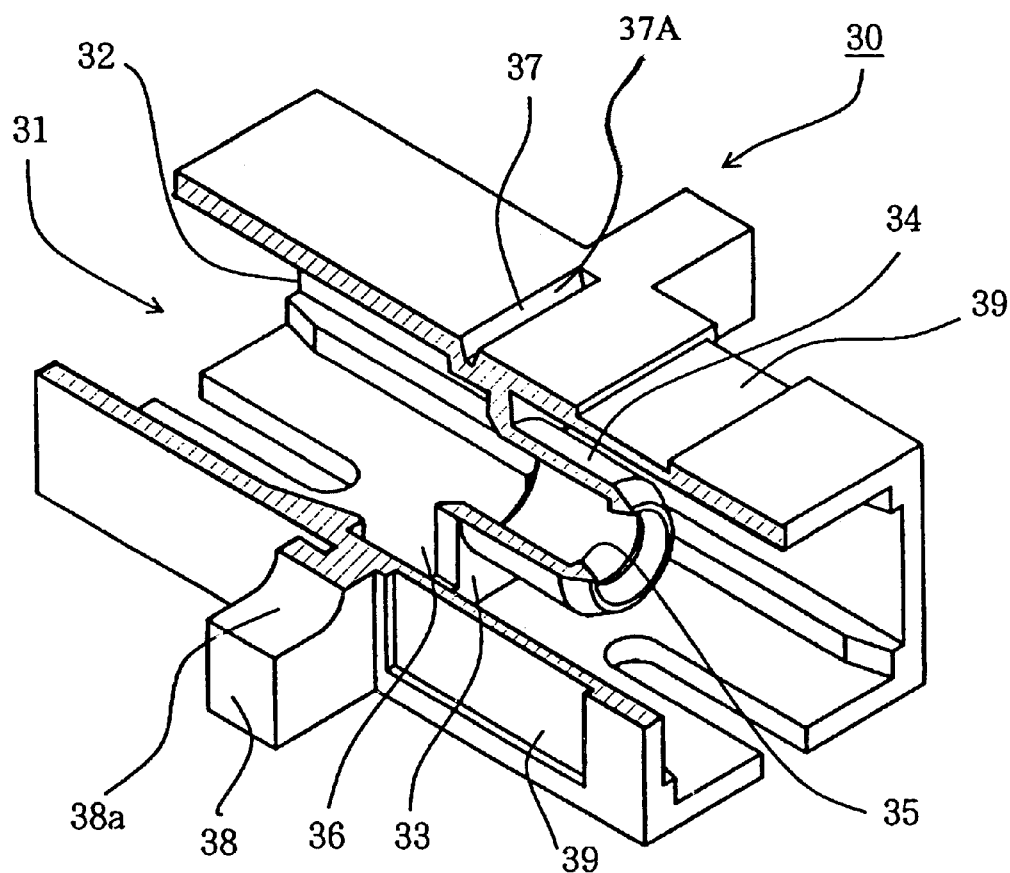
FIG. 2 is a perspective view partly cut away of a housing of the optical connector adapter according to Embodiment 1 of the present invention.
Figure 3:
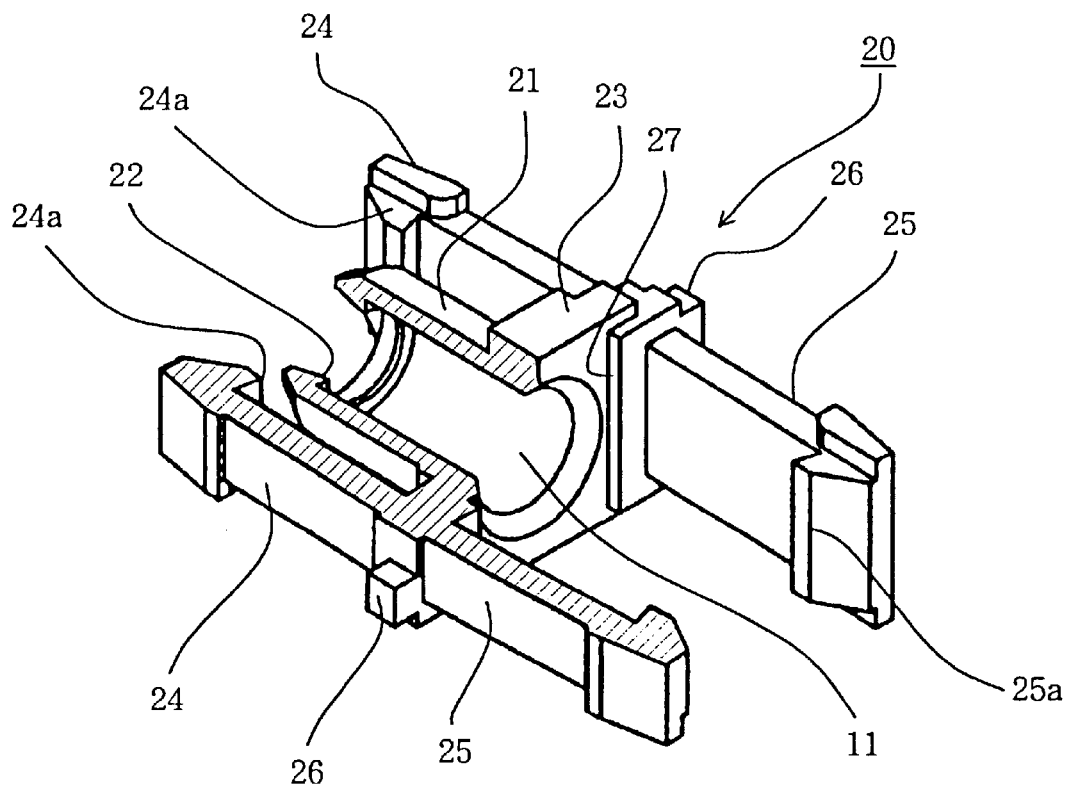
FIG. 3 is a perspective view partly cut away of a sleeve holder of the optical connector adapter according to Embodiment 1 of the present invention.
Figure 4:
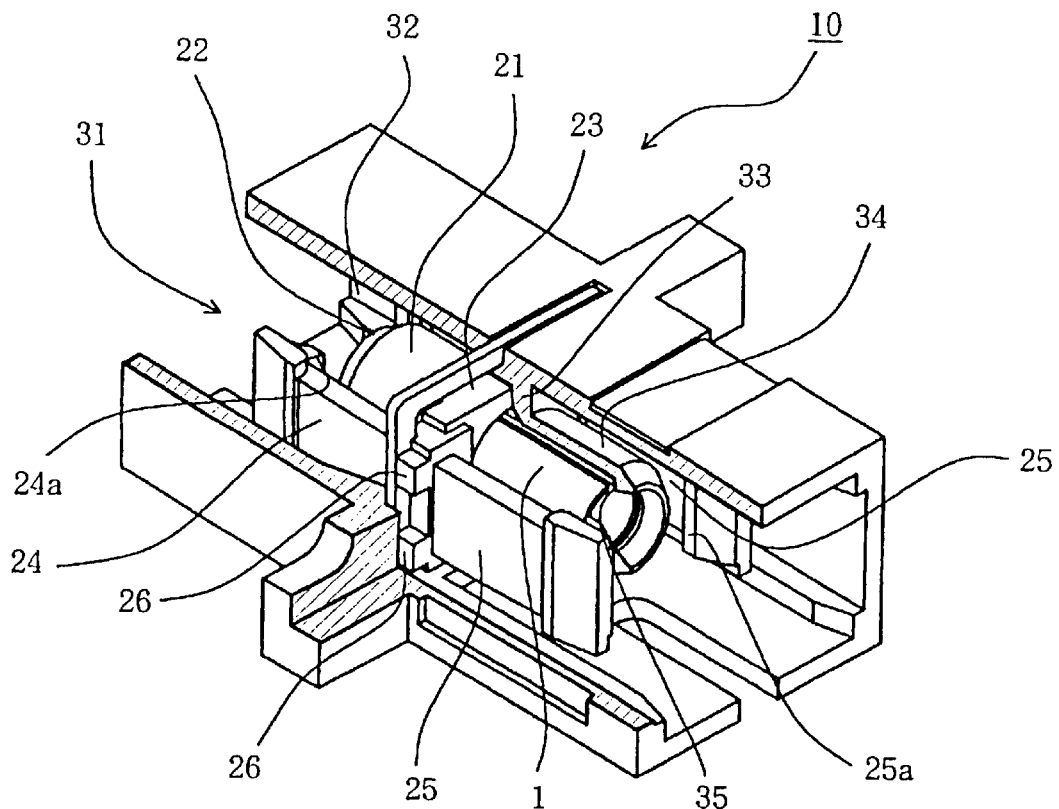
FIG. 4 is a perspective view partly cut away of the optical connector adapter according to Embodiment 1 of the present invention.

FIG. 1 is an exploded perspective view of an optical connector adapter according to Embodiment 1. FIG. 2 is a perspective view partly cut away of a housing of the same, FIG. 3 is a perspective view partly cut away of a sleeve holder with of the same, and FIG. 4 is a perspective view partly cut away of an assembly state.

An optical connector adapter 10 of this embodiment is an SC type optical connector adapter having a sleeve holder 20 and a housing 30 supporting the sleeve holder 20.

The sleeve holder 20 has a first cylindrical member 21 forming a lengthwise one end of a penetration hole 11 to incorporate an optical connection sleeve 1. The first cylindrical member 21 has, at an axial one end, a stop claw 22 formed projecting radially inward to engage the optical connection sleeve 1. The first cylindrical member 21 also has, at the other end, a rectangular-formed flange 23 provided on an outer periphery thereof.

Meanwhile, each pair of claw portions 24 and 25 are provided oppositely of shorter sides of the flange 23 such that they sandwich the first cylindrical member 21 and the housing second cylindrical member, hereinafter referred, and have a pair of claw portions 24 and 25 having engagement claws 24a and 25a at tips. These claw portions 24 and 25 are to couple with an optical connector plug. The flange 23 also has a pair of engagement protrusions 26 provided at respective ends of the shorter sides thereof. The flange 23 has a recess 27 formed in an opposite surface to the first cylindrical member 21.

The housing 30 has a penetration hole 31 with a structure to incorporate therein a sleeve holder 20. Grooves 32 are provided oppositely of shorter sides of the penetration hole 31, with which the ends of the flange 23 are respectively fitted. Meanwhile, on an opposite side to insertion from an axial center in the penetration hole 31 toward the flange 23, there are provided a flange 33 to fit with the recess 27 of the flange 23 and a second cylindrical member 34 axially extending from the flange 33. The second cylindrical member 34 has, at end, a stop claw 35 projecting radially inward to engage the optical connection sleeve 1. The flange 33 has, oppositely of shorter sides, insertion holes 36 in which a pair of claw portions 25 are respectively to be inserted.

The housing 30 has a wall provided with an insertion groove 37 formed by a groove penetrated on widthwise opposite sides so that an engagement pin 40 can be inserted to engage between the sleeve holder 20 and the housing 30.

Here, the engagement pin 40 in this embodiment is in generally a squared-U form having a pair of arms 41 for insertion in the penetration hole 37a is engagable with the engagement protrusion 26 of the sleeve holder 20.

On the other hand, a fixing flange 38 is provided at axial center on a side surface of a shorter side of the housing 30. The fixing flange 38 is provided with a fixing groove 38a to fix the housing 30. Furthermore, on opposite side surfaces of the shorter sides on axial one side of the housing 30 and surfaces between them, respective continuing recesses 39 are formed. The recesses 39 are to be fitted with a plate 50 that has a metal engagement claw 51 and in a squared-U form.

To assemble an optical connector adapter 10 in this embodiment explained above, the sleeve holder 20 is inserted in the housing 30 with optical connecting sleeve 1 sandwiched between the first cylindrical member 21 and the second cylindrical member 34. Then the engagement pin 40 may be inserted in the insertion groove 37.

Here, each of the sleeve holder 20 and the housing 30 can be integrally formed. The sleeve holder 20 is preferably formed by plastic molding, and the housing 30 is preferably by plastic molding, metal injection molding (MIM) or die cast.

(Embodiment 2)

Figure 5:
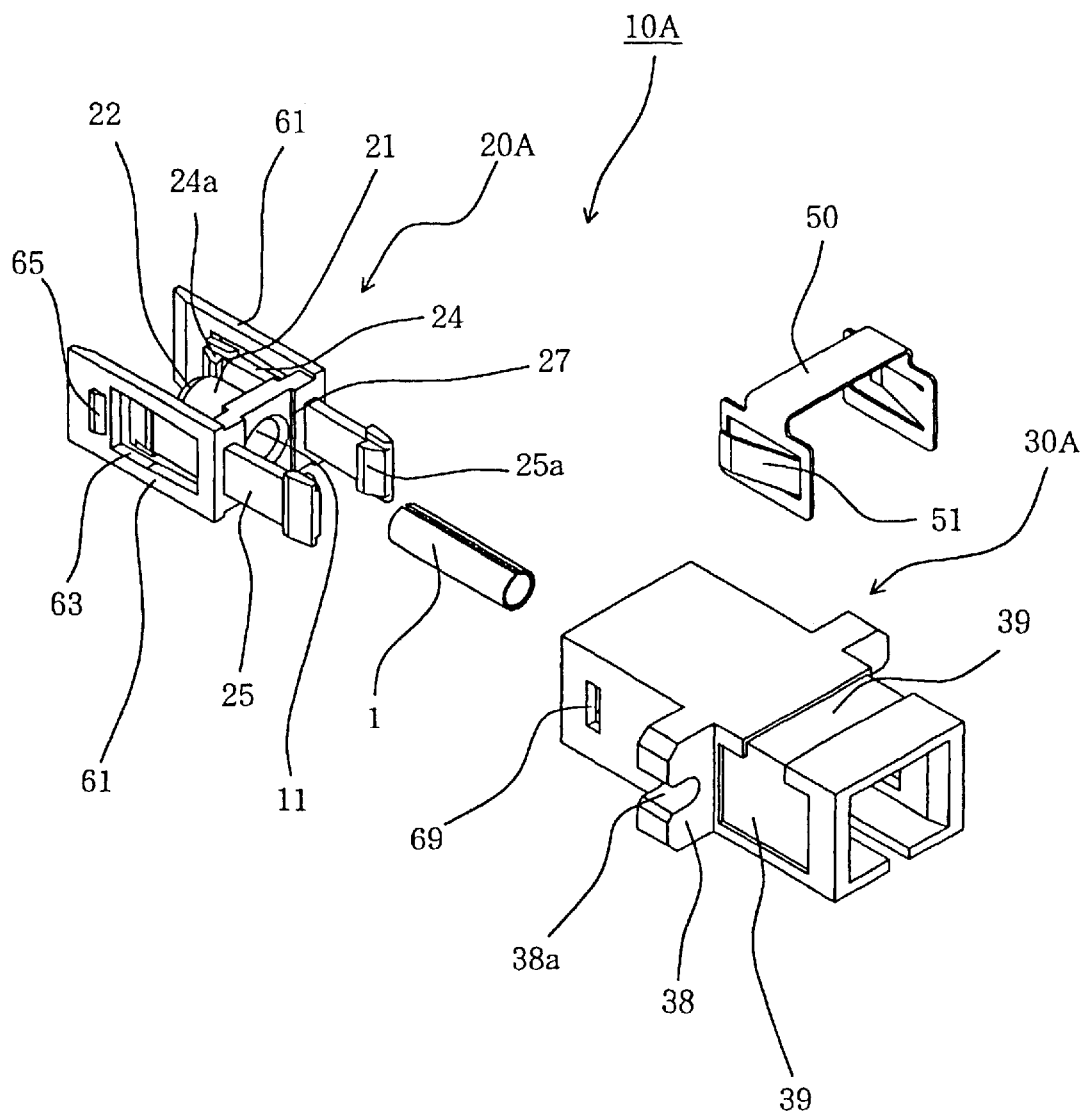
FIG. 5 is an exploded perspective view of an optical connector adapter according to Embodiment 2 of the present invention.
Figure 6:
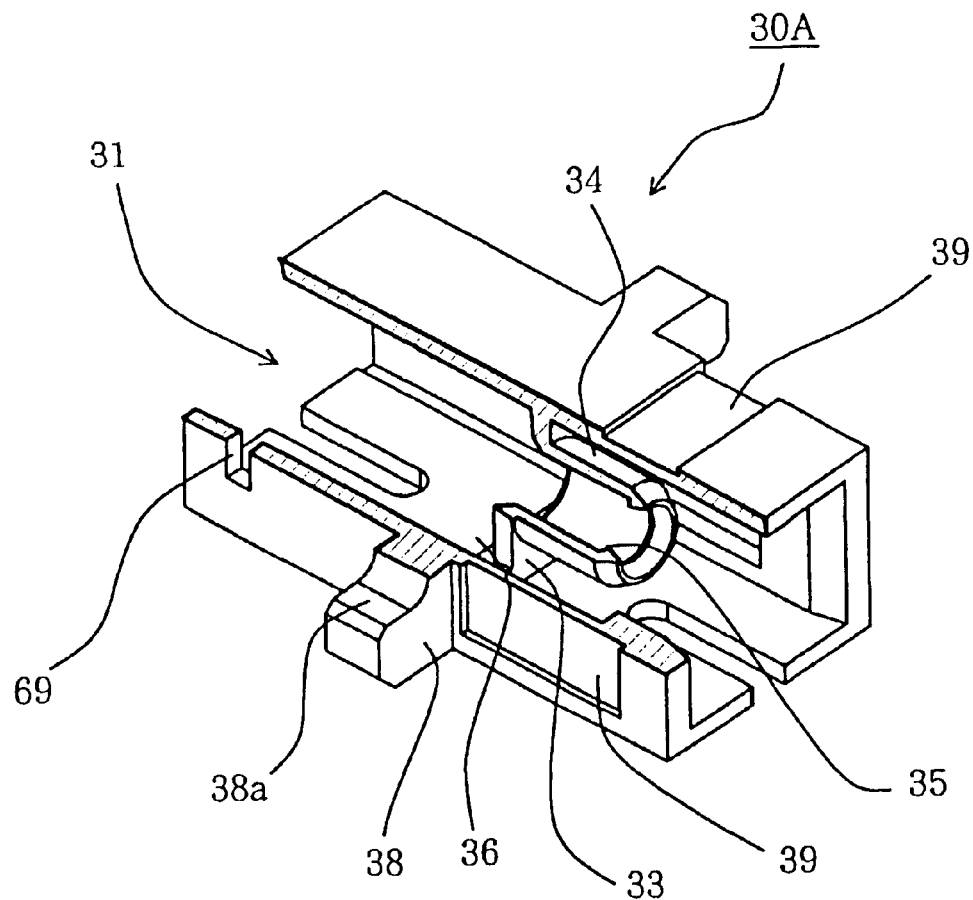
FIG. 6 is a perspective view partly cut away of a housing of the optical connector adapter according to Embodiment 2 of the present invention.
Figure 7:
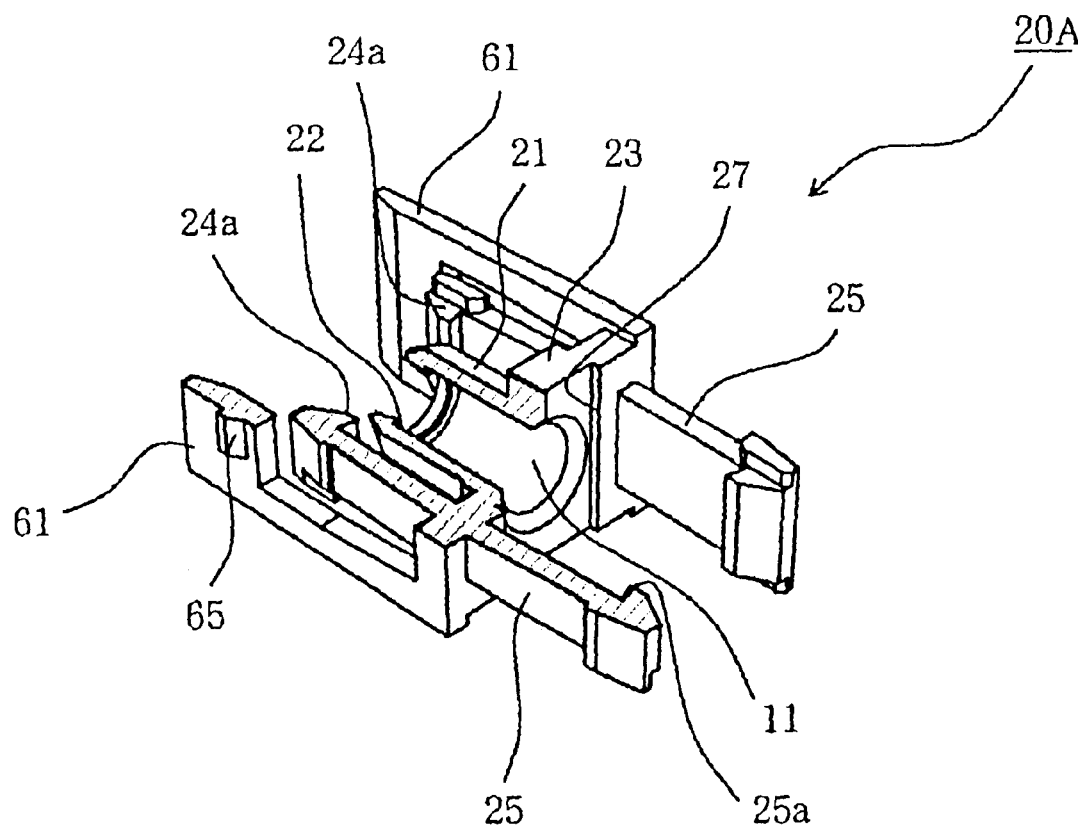
FIG. 7 is a perspective view partly cut away of a sleeve holder of the optical connector adapter according to Embodiment 2 of the present invention.
Figure 8:
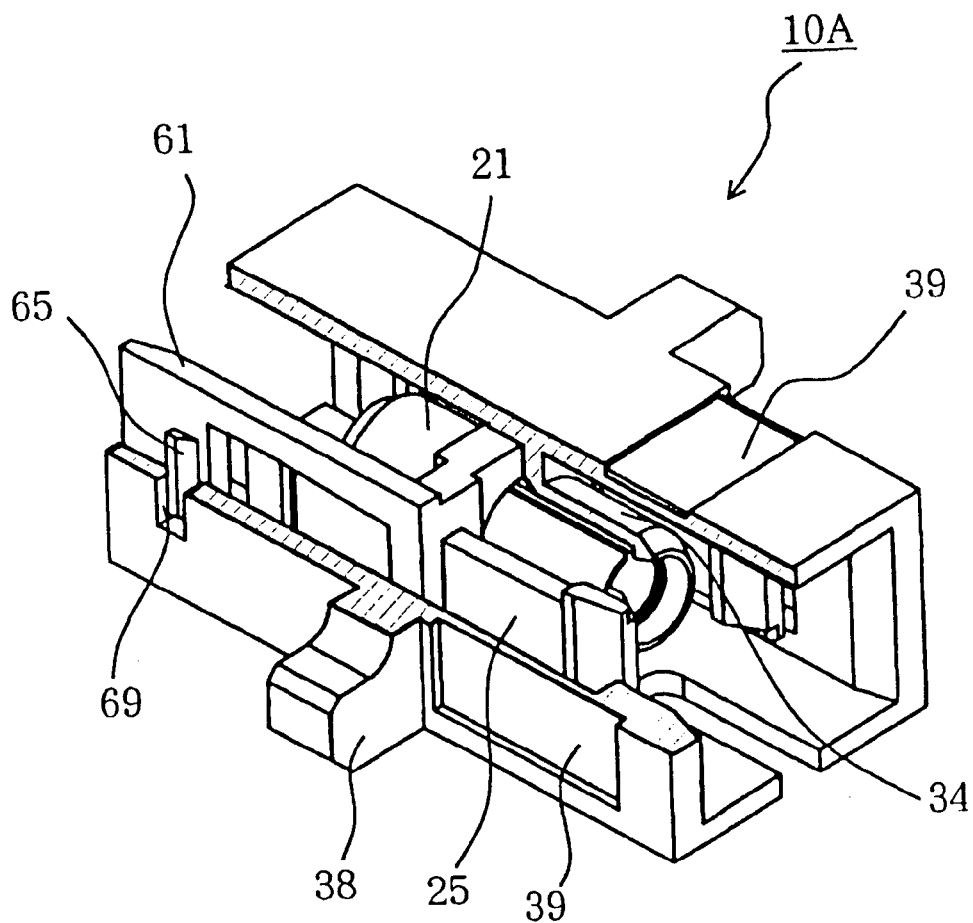
FIG. 8 is a perspective view partly cut away of the optical connector adapter according to Embodiment 2 of the present invention.

FIG. 5 is an exploded perspective view of an optical connector adapter according to Embodiment 2. FIG. 6 is a perspective view partly cut away of a housing of the same, FIG. 7 is a perspective view partly cut away of a sleeve holder of the same, and FIG. 8 is a perspective view partly cut away of an assembly state.

An optical connector adapter 10A of this embodiment is same in basic structure as that of Embodiment 1 except for differences therefrom in a sleeve holder 20A and in engagement means for engaging a housing 30A holding the sleeve holder 20A. Hence, the same elements having a same function are denoted by the same reference characters to omit duplicated explanations.

The sleeve holder 20A is different from that of Embodiment 1 in that a pair of guide member 61 are provided standing, along a pair of claw portions 24, at ends on shorter sides of a rectangular flange 23 provided on an outer periphery at an end of a first cylindrical member 21 and an engagement protrusion 65 is provided on an outer side of a tip of the guide member 61. Also, the guide member 61 is formed with a window 63 in an opposed position to the claw portion 24 not to interfere with elastic deformation of the claw portion 24. Incidentally, the pair of guide members 61 have an exterior dimension to generally fit with the penetration hole 31 of the housing 30A.

On the other hand, the housing 30A is different from that of Embodiment 1 in that an engagement hole 69 is provided in a side surface with which an engagement protrusion 65 provided in the guide member 61 engages.

To assemble an optical connector adapter 10 of the present embodiment explained above, the sleeve holder 20A is inserted in the housing 30A with the optical connection sleeve 1 sandwiched between the first cylindrical member 21 and the second cylindrical member 34. Then the engagement protrusion 65 of the guide member 61 may be engaged with the engagement hole 69 of the housing 30A.

(Embodiment 3)

Figure 9:
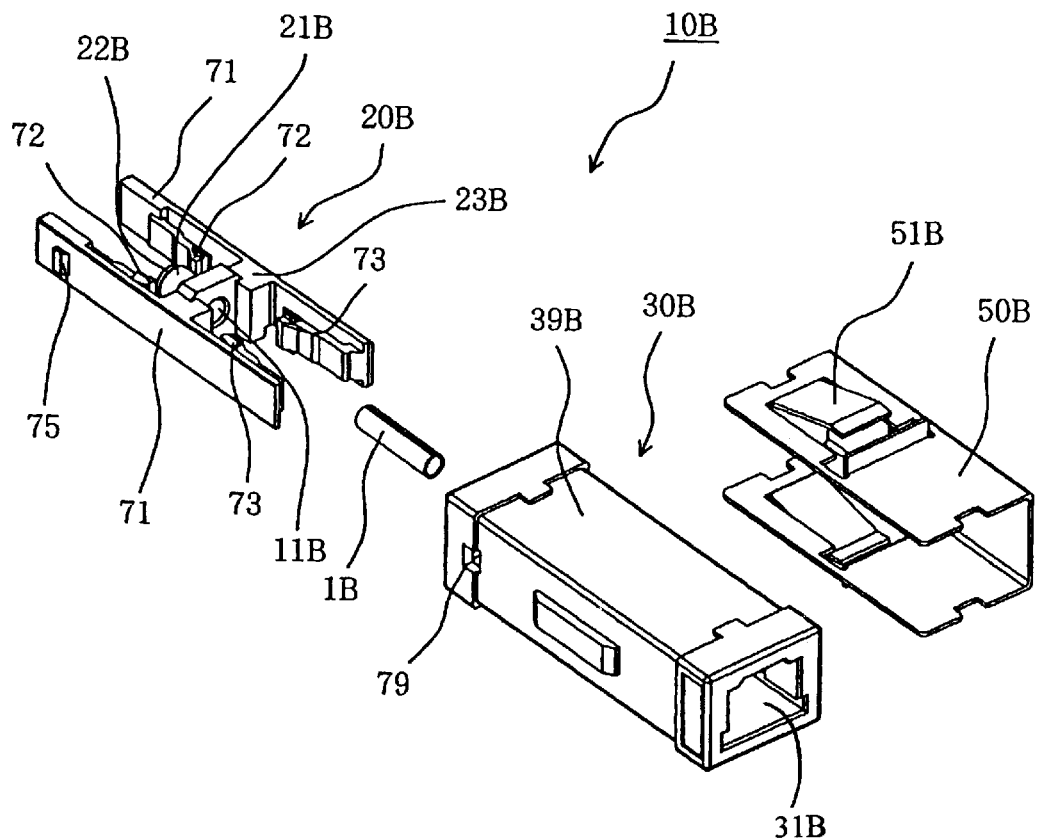
FIG. 9 is an exploded perspective view of an optical connector adapter according to Embodiment 3 of the present invention.
Figure 10:
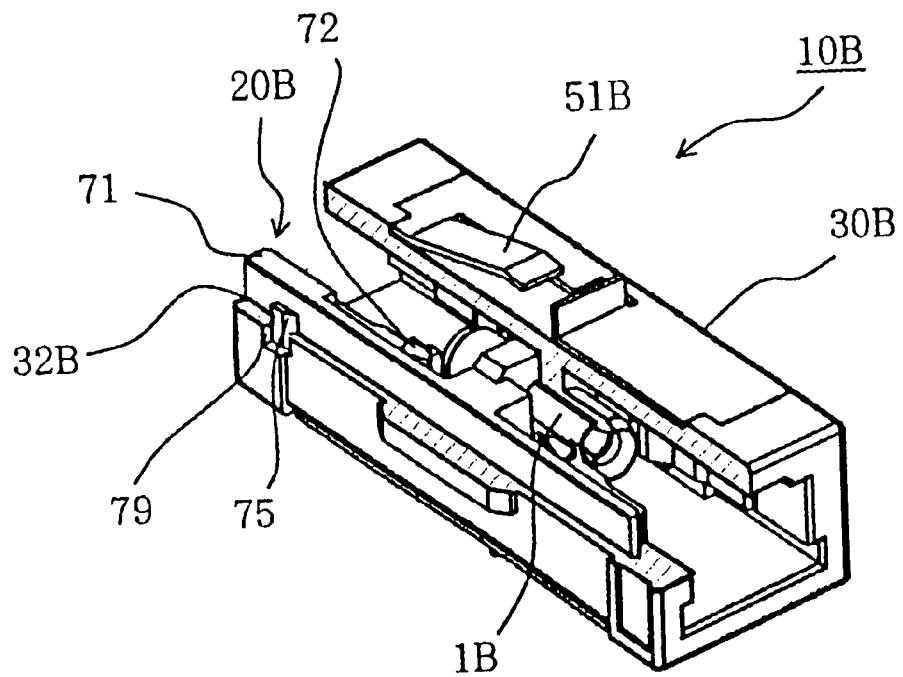
FIG. 10 is a perspective view partly cut away of the optical connector adapter according to Embodiment 3 of the present invention.
Figure 11:
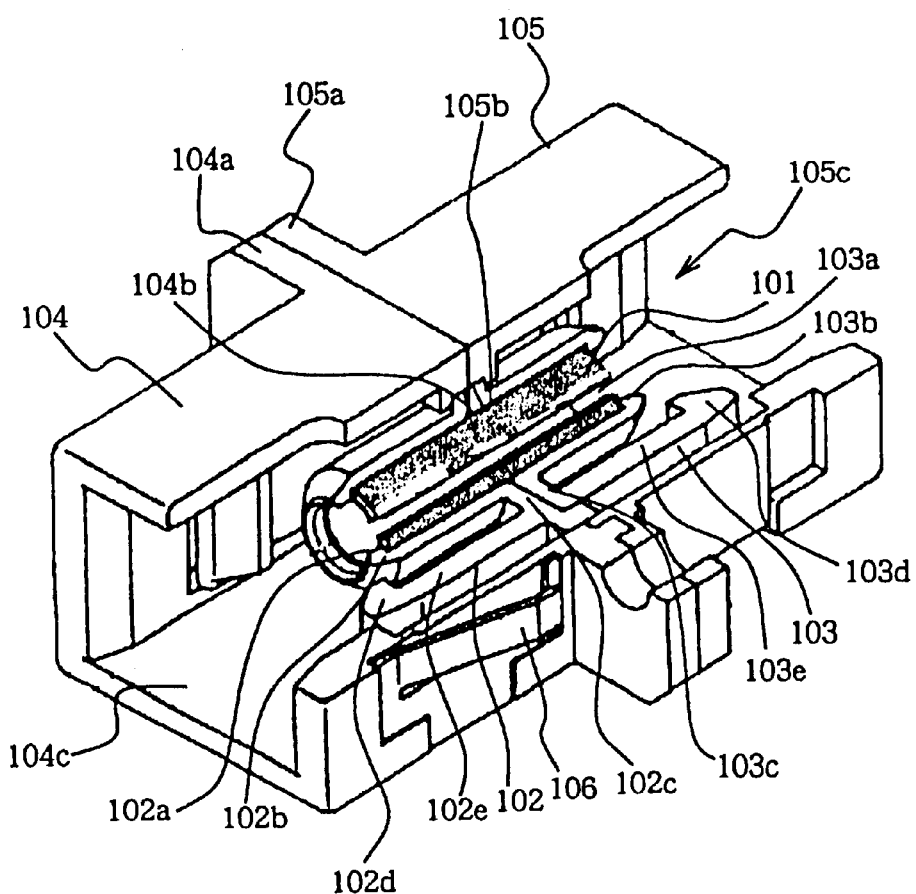
FIG. 11 is a perspective view partly cut away of an SC type optical connector adapter according to a prior art.
Figure 12:
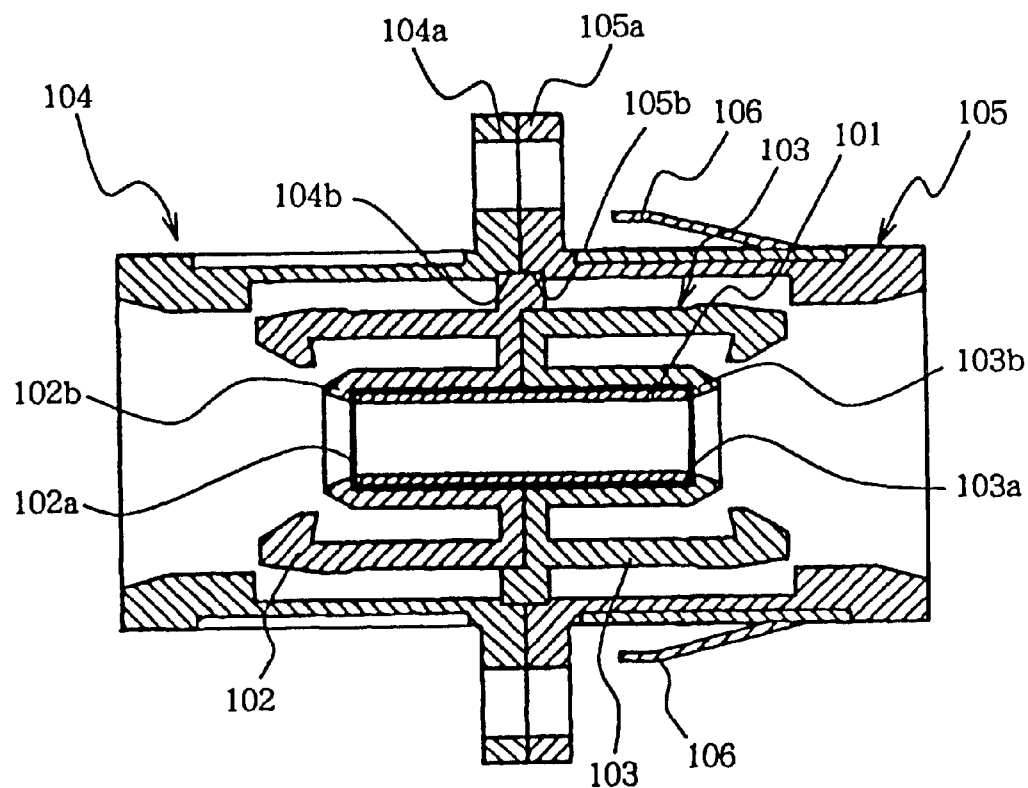
FIG. 12 is a sectional view the an SC type optical connector adapter according to the prior art.

FIG. 9 is an exploded perspective view of an optical connector adapter according to Embodiment 3. FIG. 10 is a perspective view party cut away of an assembly state.

An optical connector adapter 10B of this embodiment is similar in basic structure to that of Embodiment 2 except that it is an MU type optical connector adapter. Hence, the same elements having a same function are denoted by the same reference characters to omit duplicated explanations. The connector adapter 10B has a sleeve holder 20B and a housing 30B supporting the sleeve holder 20B.

The sleeve holder 20B has a first cylindrical member 21B forming a lengthwise one end of a penetration hole 11B to incorporate an optical connection sleeve 1 which has small radius for MU type optical connector. The first cylindrical member 21B has, at an axial one end, a stop claw 22B formed projecting radially inward to engage the optical connection sleeve 1B. The first cylindrical member 21B also has, at the other end, a rectangular-formed flange 23B provided on an outer periphery thereof. The flange 23B is provided guide members 71 on respective short-side side.

The guide members 71 have an exterior shape to be generally fit with guide grooves 32B provided in a penetration hole 31B of the housing 30B, hereafter referred. At inner side of the guide member 71, respective one pairs of engagement claws 72 and 73 are provided. These engagement claws 72 and 73 are to couple with an MU type connector plug. Also, an engagement protrusion 75 is provided at an outside of the first cylindrical member 21B of the guide member 71.

On the other hand, the housing 30B has guide grooves 32B with which the guide members 71 is to be fit, and an engagement hole 79 with which the engagement protrusion 75 is to be engaged. Incidentally, the housing 30B in its surface is formed with a recess 39B with which a plate 50B having an engagement claw 51B is to be fit.

To assemble an optical connector adapter 10B in this embodiment explained above, the sleeve holder 20B is inserted in the housing 30B with optical connecting sleeve 1B sandwiched between the first cylindrical member 21B and the second cylindrical member 34B. Then the engagement protrusion 75 of the guide member 71 may be engaged with the engagement hole 79 of the housing 30B.

(Embodiments 4 and 5)

Figure 13:
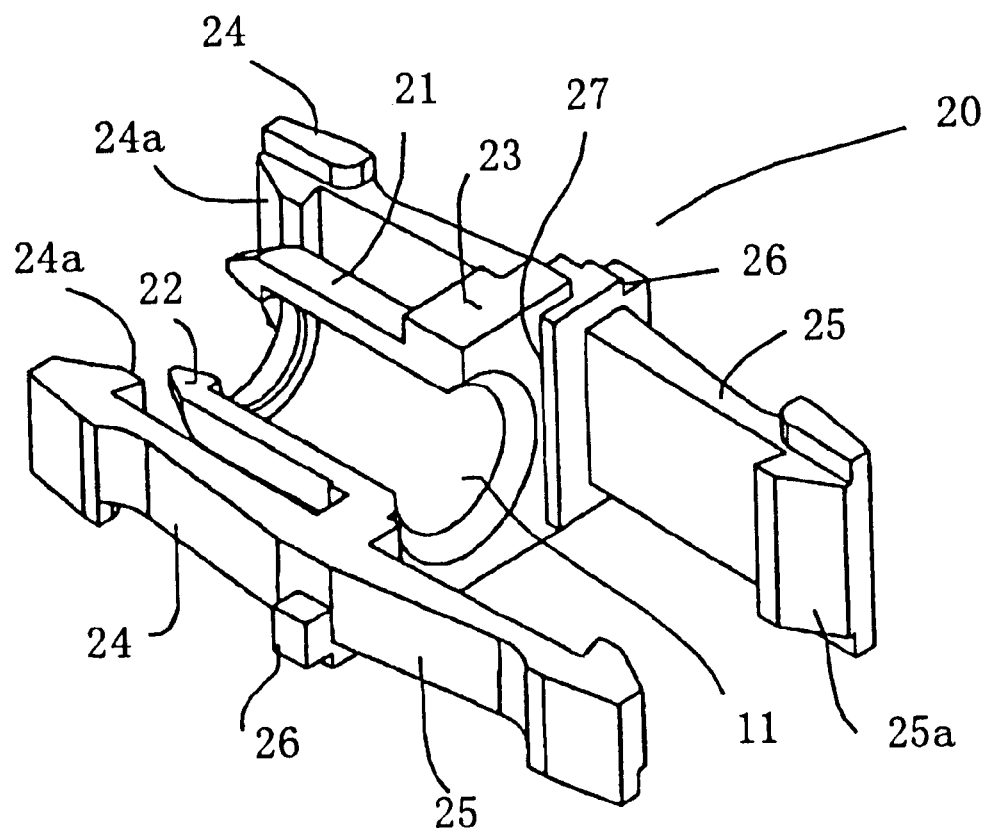
FIG. 13 is a perspective view of a sleeve holder of the optical connector adapter of the present invention.
Figure 14:
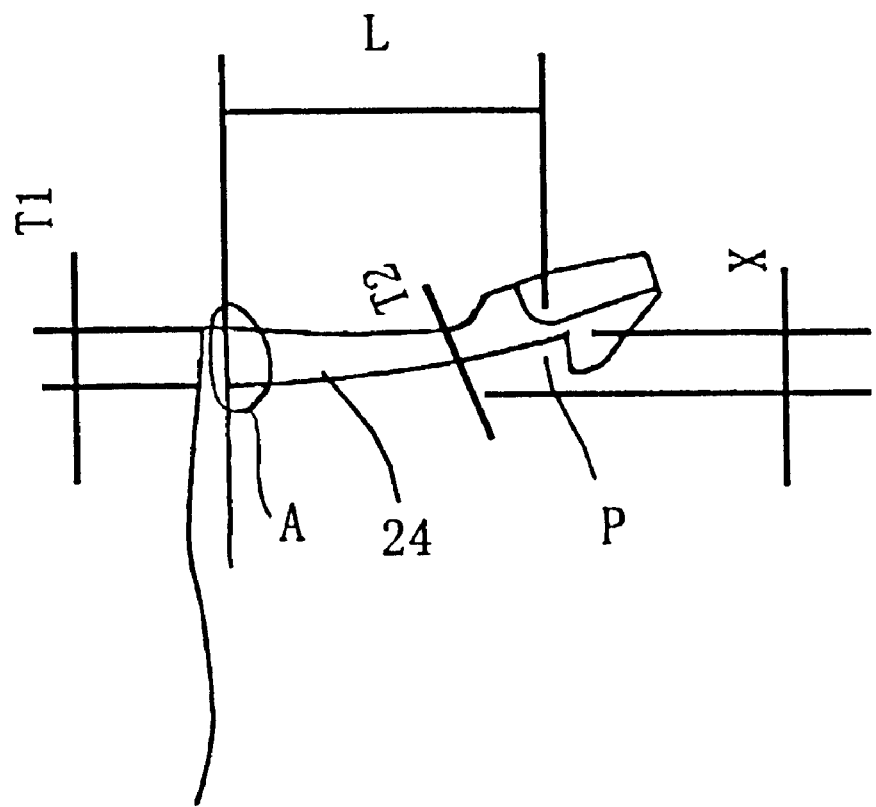
FIG. 14 is a sectional view of a claw portion of the invention.

FIG. 13 is a perspective view partly cut away of a sleeve holder, wherein on an outer peripheral side of the claw portion 24, 25 a slant surface is formed having a thickness decreasing toward an axial outer side. FIG. 14 is a figure showing a state of a mechanical strength when the elastic deformation of the claw portion 24 becomes a maximum. The elastic deforming portion has a length L of 6.2 mm and the width of the elastic deforming portion in a vertical direction of the figure is 4 mm. Here, the maximum stress σ at a region A can be by providing a thickness T1 of 1.0 mm or greater to a root of the claw portion 24 and a continually decreasing thickness T2, e.g. of 0.5 mm to 0.9 mm, to a connection portion with a tip engagement recess. In the figure, a sectional form of the claw portion at outer side of the cylindrical member is a concave-formed curved surface. Also, because the reduction in elastic load P can also be avoided in the vicinity of the engagement recess, there is no inconvenience for coupling and disconnection operation between the optical connector plug and the optical connector adapter.

Here, by setting T1 as a maximum claw thickness at from 1.0 mm to 1.2 mm and T2 as a minimum thickness at from 0.6 mm to 0.8 mm, the maximum stress a at the region A becomes 12 to 16 kgf/mm$^2$. The elastic load for this case can be given from 1.0 to 1.5 kgf.

(Embodiments 6)

Figure 15:
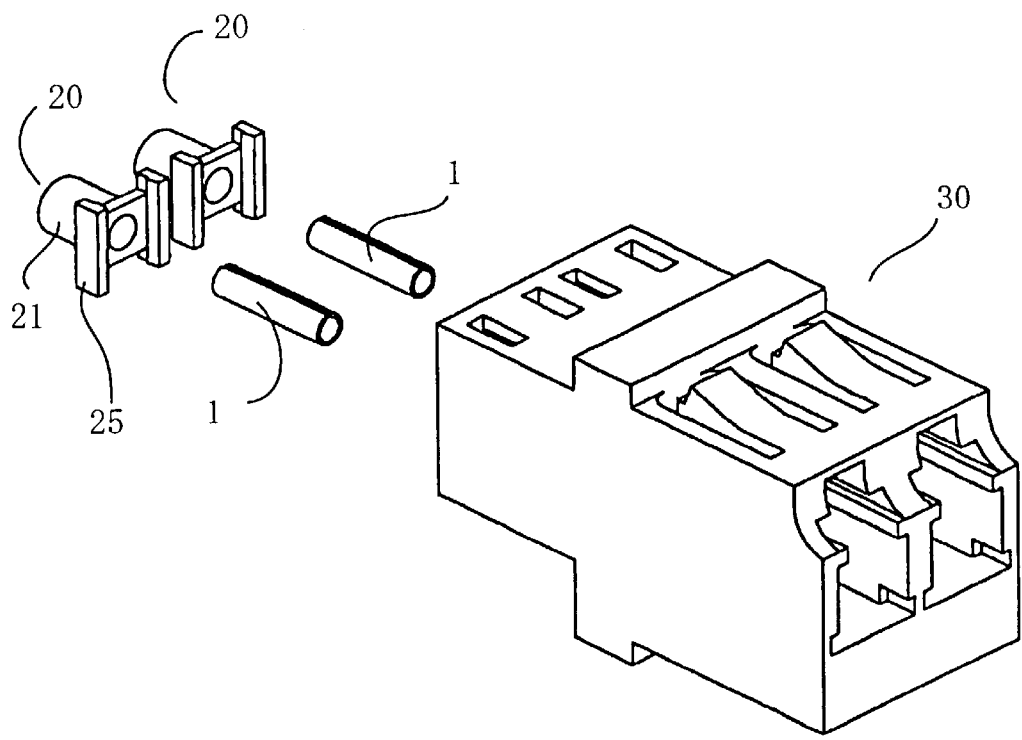
FIG. 15 is an exploded perspective view of an optical connector adapter according to Embodiment 6 of the present invention.
Figure 16:
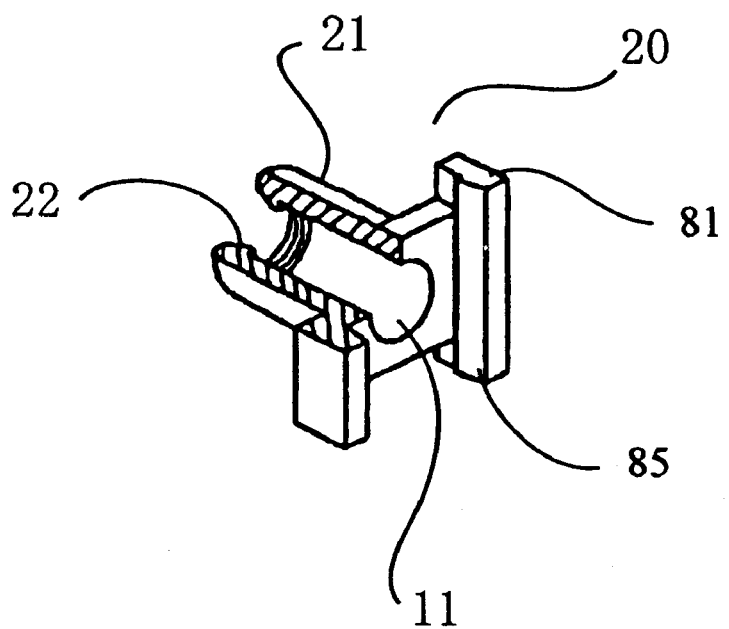
FIG. 16 is a perspective view partly cut away of a sleeve holder of the optical connector adapter according to Embodiment 6 of the present invention.
Figure 17:
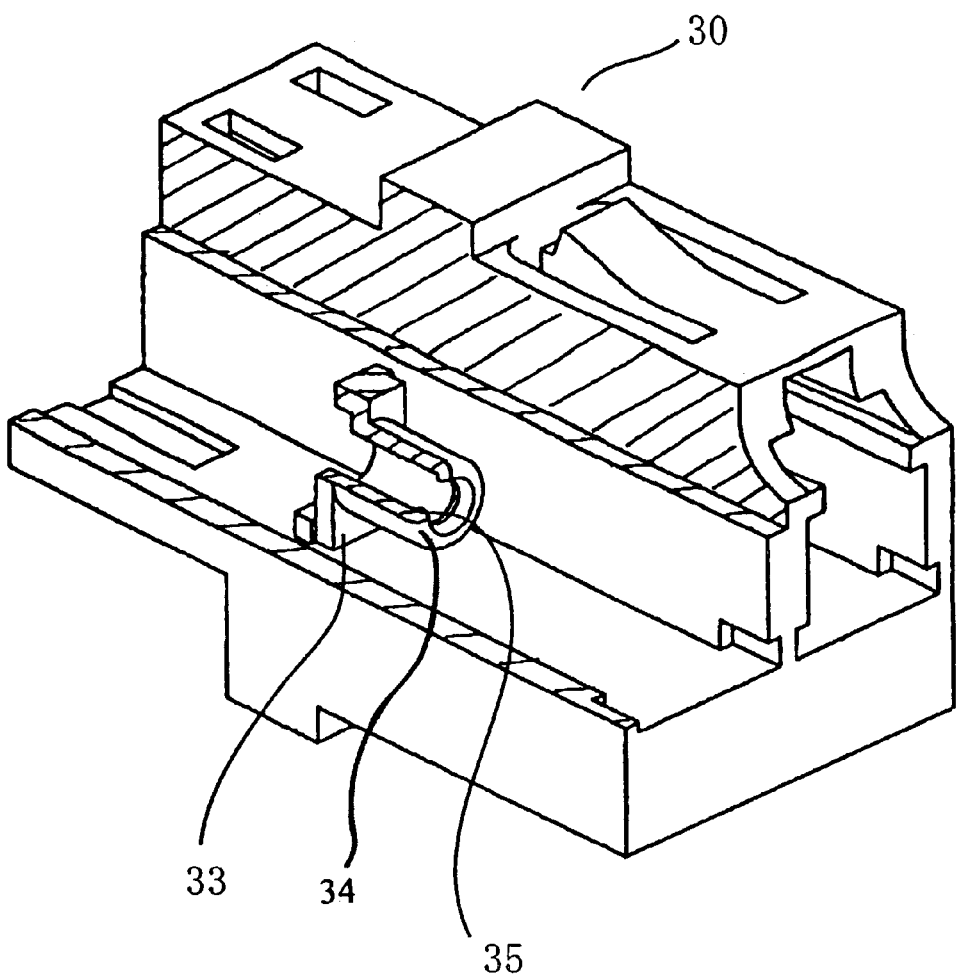
FIG. 17 is a perspective view partly cut away of a housing of the optical connector adapter according to Embodiment 6 of the present invention.
Figure 18:
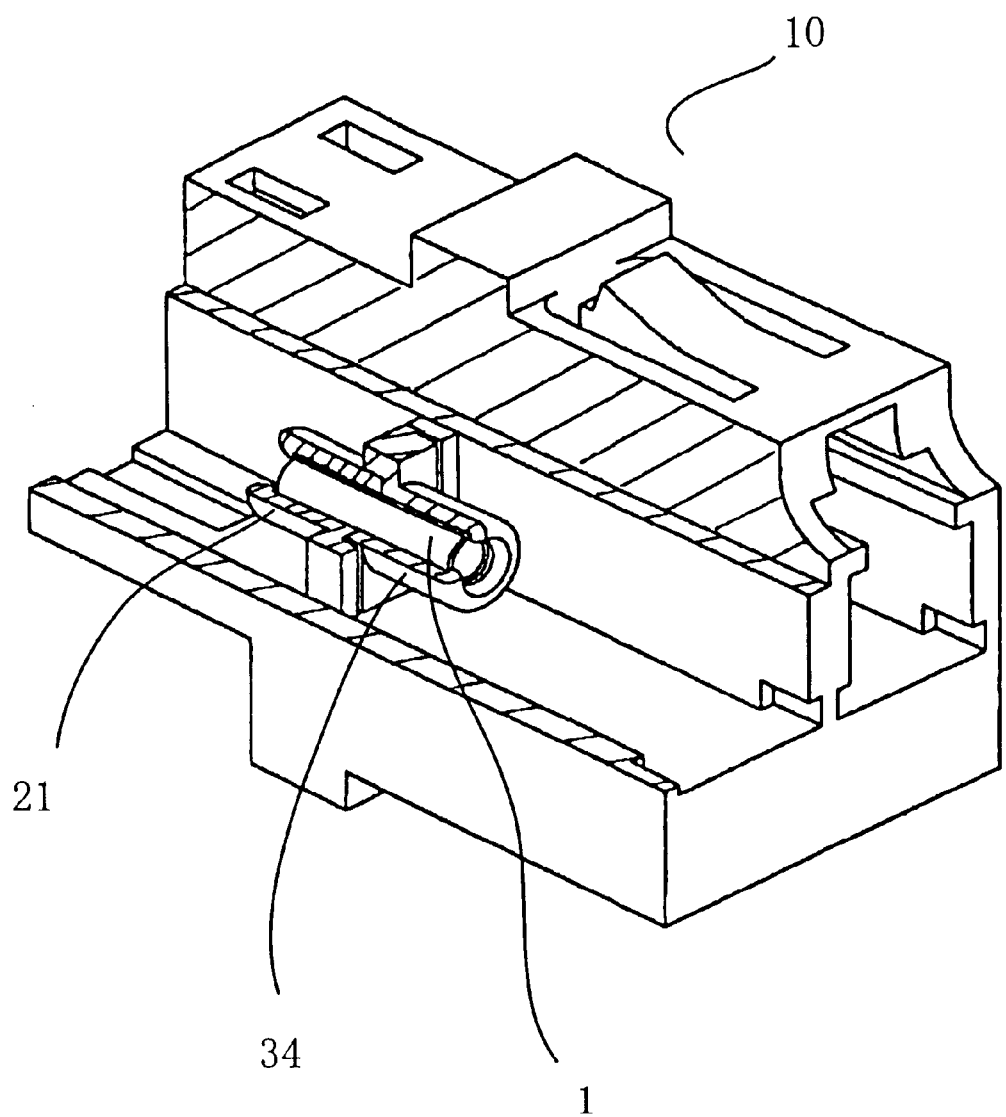
FIG. 18 is a perspective view partly cut away of the optical connector adapter according to Embodiment 6 of the present invention.
Figure 19A:
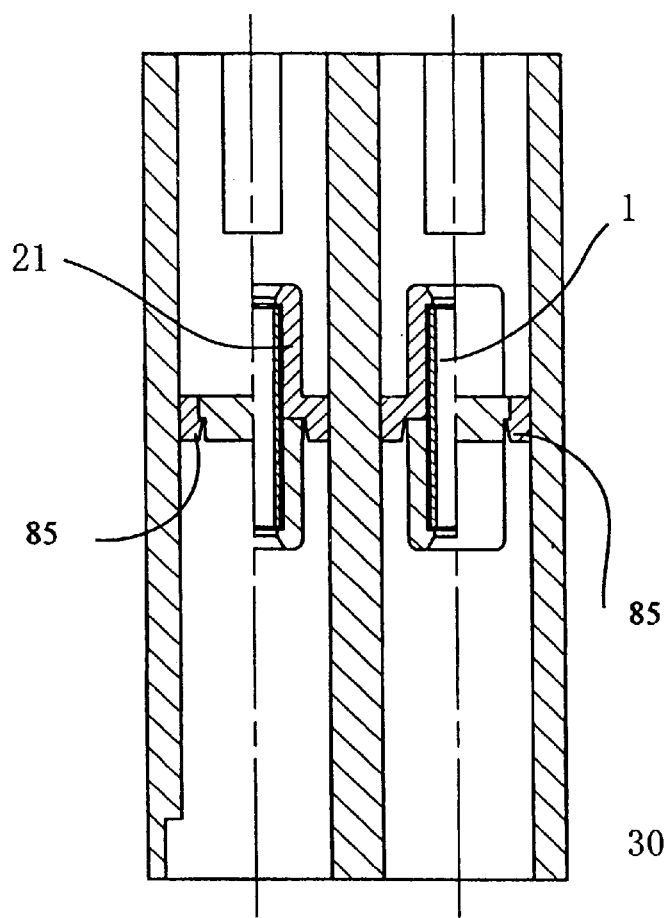
FIGS. 19A–B are a sectional view and a side view of the optical connector adapter according to Embodiment 6 of the present invention.
Figure 19B:
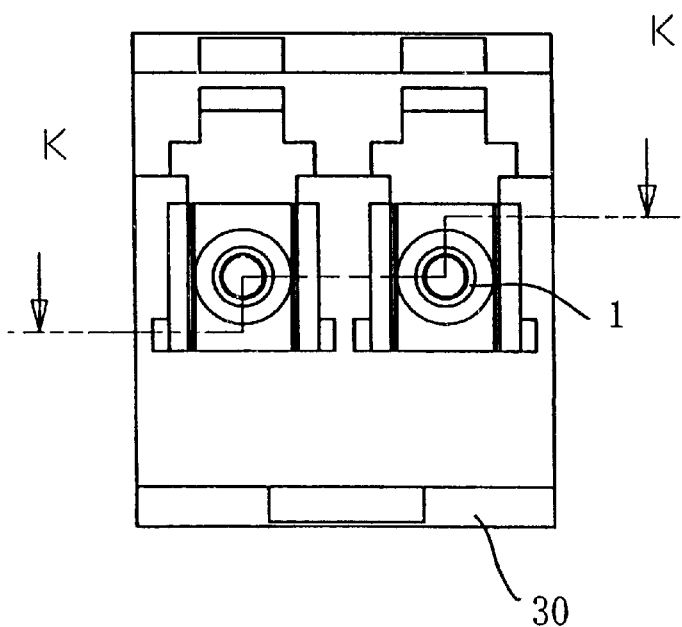

FIG. 15 is an exploded perspective view of an optical connector adapter according to Embodiment 6 of the present invention. FIG. 16 is a perspective view partly cut away of a sleeve holder of the optical connector of the same. FIG. 17 is a perspective view partly cut away of a housing of the optical connector adapter of the same. FIG. 18 is a perspective view partly cut away of the optical connector adapter of the same. FIG. 19A is a sectional view from cut line K of FIG. 19B, which is a side view of the optical connector adapter of the same.

An optical connector of this invention has a pair of sleeve holder 20, corresponding sleeve 1 and a housing 30 supporting the sleeve holders 20. The sleeve holder 20 has a first cylindrical member 21 forming a lengthwise one end of a penetration hole 11 to incorporate an optical connection sleeve 1. The first cylindrical member 21 has, at an axial one end, a stop claw 22 formed projecting radially inward to engage the optical connection sleeve 1. Further a pair of guide members 81 has a pair of engagement protrusions 85.

The housing 30 has a flange 33 and a second cylindrical member 34 axially extending from the flange 33. The second cylindrical member 34 has, at end, a stop claw 35 projecting radially inward to engage the optical connection sleeve 1.

(Others)

As explained above, according to the present embodiment, the number of parts for the SC type optical connector adapter can be reduced from conventional six to four, thus reducing cost.

Also, assembling operation is possible, for example, only by driving a pin with omitting ultrasonic welding, screwing, riveting or the like, thereby greatly simplifying operation process.

Furthermore, because the housing is made integral, the shaft having a shape to receive the plug does not deviate left and right, enabling stable optical connection.

Although the present embodiment was explained by exemplifying the SC type, MU type or LC type optical connector adapter, the invention is not limited to that structure. It is needless to say that the invention is applicable to other similar adapters.

As explained above, according to the present embodiment, because the number of parts for the SC type optical connector adapter can be reduced from conventional six to four and assembling operation can be greatly simplified, it is possible to greatly reduce cost.

What is claimed is:

1. An optical connector adapter comprising:
    an optical connection sleeve having a first end portion and a second end portion opposite the first end portion;
    a sleeve holder having a first cylindrical member having a first through-hole for receiving the first end portion of the optical connection sleeve;
    a housing for receiving and supporting the sleeve holder, the housing having a second cylindrical member having a second through-hole for receiving the second end portion of the optical connection sleeve;
    engagement means for engaging the sleeve holder and the housing together in a state that a first end of the first cylindrical member and a first end of the second cylindrical member are abutted against each other; and
    a plurality of convex portions projecting radially inward at respective second ends of the first cylindrical member and the second cylindrical member for regulating movement of the optical connection sleeve in an axial direction.

2. An optical connector adapter according to claim 1; wherein the engagement means comprises an engagement pin disposed in the housing when the sleeve holder is disposed in the housing, and an engagement portion integral with the sleeve holder for engaging the engagement pin.

3. An optical connector adapter according to claim 1; wherein the engagement means comprises a pair of elastically deformable claw portions formed on one of the housing and the sleeve holder, and a pair of engagement recesses formed on the other of the housing and the sleeve holder and each for engaging a respective one of the claw portions.

4. An optical connector adapter according to claim 3; wherein each of the claw portions has an engagement claw having a thickness continuously decreasing toward a tip of the claw portion.

5. An optical connector adapter according to claim 4; wherein each of the engagement claws is generally concave-shaped and extends from an outer periphery of the first cylindrical member.

6. An optical connector adapter according to claim 1; wherein the housing has an aperture for connection to an optical connector plug.

7. An optical connector adapter according to claim 1; further comprising a flange extending from an end of the first cylindrical member.

8. An optical connector adapter according to claim 7; wherein the flange is generally rectangular-shaped.

9. An optical connector adapter according to claim 8; wherein the engagement means comprises two pairs of claw portions each extending from opposite sides of the flange so that the first cylindrical member and the second cylindrical member are each disposed between a respective pair of the claw portions when the sleeve holder is disposed in the housing.

10. An optical connector adapter according to claim 9; wherein each of the claw portions has an engagement claw.

11. An optical connector adapter according to claim 8; further comprising a pair of engagement protrusions disposed at opposite sides of the flange.

12. An optical connector adapter according to claim 8; wherein the flange has a recess formed in a surface thereof opposite to the first cylindrical member.

13. An optical connector adapter according to claim 9; wherein each of the claw portions has an engagement claw each having a thickness continuously decreasing toward a respective one of the engagement convex portions.

14. An optical connector adapter according to claim 13; wherein each of the engagement claws is generally concave-shaped and extends from an outer periphery of the first cylindrical member.

15. An optical connector adapter according to claim 1; wherein the first cylindrical member is molded in one piece with the sleeve holder.

16. An optical connector adapter according to claim 1; wherein the housing has a plurality of apertures disposed generally parallel to each other.

17. An optical connector adapter according to claim 1; wherein the second cylindrical member is molded in one piece with the housing.

18. An optical connector adapter comprising:
    a housing having a first tubular member, a first flange extending from a peripheral end surface portion of the first tubular member, an engagement recess, and an insertion groove;
    a sleeve holder disposed in the housing and having a second tubular member, a second flange extending from a peripheral end surface portion of the second tubular member and abutting the first flange, at least one pair of protrusions each extending from a respective side of the second flange, and at least one connecting portion engaging the engagement recess of the housing;
    a connection sleeve having a first end portion disposed in the first tubular member and a second end portion opposite the first end portion and disposed in the second tubular member; and
    an engagement pin extending through the insertion groove of the housing and engaging the protrusions of the sleeve holder.

19. An optical connector adapter according to claim 18; wherein the housing is molded from a single piece of material.

20. An optical connector adapter according to claim 18; wherein the sleeve holder is molded from a single piece of material.

21. An optical connector adapter according to claim 1; further comprising a flange extending from an end of the first cylindrical member; and wherein the engagement means comprises two pairs of claw portions each extending from opposite sides of the flange so that the first cylindrical member and the second cylindrical member are each disposed between a respective pair of the claw portions when the sleeve holder is disposed in the housing.

22. An optical connector adapter according to claim 21; wherein each of the claw portions has an engagement claw.

23. An optical connector adapter according to claim 22; wherein the engagement means comprises a pair of elastically deformable guide members having a engagement protrusion formed on the sleeve holder, and a pair of engagement recesses formed on the housing for engaging a respective one of the engagement claws.

24. An optical connector adapter according to claim 23; wherein each of the guide members has a thickness continuously decreasing toward a tip of the guide member.

25. An optical connector adapter according to claim 21; wherein each of the claw portions has a thickness continuously decreasing toward a tip of the claw portion.

26. An optical connector adapter according to claim 1; wherein the engagement means comprises an engagement pin disposed in the housing when the sleeve holder is disposed in the housing, and an engagement portion integral with the sleeve holder for engaging the engagement pin.

27. An optical connector adapter according to claim 26; further comprising a flange extending from an end of the first cylindrical member, the flange having a pair of opposite long sides and a pair of opposite short sides; and wherein the engagement portion is disposed at the ends of the short sides of the flange.

28. An optical connector adapter according to claim 26; wherein the engagement pin has a square cross-section and is generally U-shaped.

29. An optical connector adapter according to claim 26; wherein the housing has a groove for receiving the engagement pin.

30. An optical connector adapter according to claim 7; wherein the flange has a recess formed in a surface thereof opposite to the first cylindrical member.

31. An optical connector adapter according to claim 30; further comprising a flange extending from an end of the second cylindrical member of the housing for insertion into the recess of the flange extending from an end of the first cylindrical member.

32. An optical connector adapter according to claim 31; wherein the flange extending from the end of the second cylindrical member of the housing is generally rectangular-shaped.

\* \* \* \* \*